(12) United States Patent
Butterfield, IV

(10) Patent No.: US 9,285,202 B2
(45) Date of Patent: Mar. 15, 2016

(54) MODULAR TANK CONSTRUCTION AND DECONSTRUCTION METHODS AND TOOLS FOR USE THEREIN

(71) Applicant: Albert Eugene Butterfield, IV, Novato, CA (US)

(72) Inventor: Albert Eugene Butterfield, IV, Novato, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 285 days.

(21) Appl. No.: 14/041,792

(22) Filed: Sep. 30, 2013

(65) Prior Publication Data
US 2014/0173873 A1 Jun. 26, 2014

Related U.S. Application Data

(63) Continuation-in-part of application No. 13/486,986, filed on Jun. 1, 2012, now Pat. No. 8,903,927.

(51) Int. Cl.
| | |
|---|---|
| B25B 27/16 | (2006.01) |
| G01B 5/25 | (2006.01) |
| B25D 7/00 | (2006.01) |
| B65D 88/08 | (2006.01) |
| B65D 90/02 | (2006.01) |
| B65D 90/08 | (2006.01) |
| B25C 3/00 | (2006.01) |

(52) U.S. Cl.
CPC . G01B 5/25 (2013.01); B25C 3/008 (2013.01); B25D 7/00 (2013.01); B65D 88/08 (2013.01); B65D 90/024 (2013.01); B65D 90/08 (2013.01); *Y10T 29/49778* (2015.01); *Y10T 29/49826* (2015.01); *Y10T 29/49895* (2015.01); *Y10T 29/49902* (2015.01); *Y10T 29/49947* (2015.01); *Y10T 29/49948* (2015.01); *Y10T 29/50* (2015.01); *Y10T 29/5177* (2015.01); *Y10T 29/53091* (2015.01); *Y10T 29/53909* (2015.01); *Y10T 29/53913* (2015.01)

(58) Field of Classification Search
CPC ........ G01B 5/25; B65D 90/024; B65D 88/08; B65D 90/08; B25D 7/00; Y10T 29/53091; Y10T 29/53909; Y10T 29/53913; Y10T 29/44947; Y10T 29/5177; Y10T 29/50; Y10T 29/49948; Y10T 29/49902; Y10T 29/49895; Y10T 29/49826; Y10T 29/497
See application file for complete search history.

(56) References Cited

U.S. PATENT DOCUMENTS

| | | | | |
|---|---|---|---|---|
| 3,550,486 | A * | 12/1970 | Edwards | B25B 23/12 81/125 |
| 3,685,126 | A * | 8/1972 | Kane | B25D 1/16 29/254 |
| 4,555,841 | A * | 12/1985 | James | B23K 37/0533 228/175 |
| 5,004,017 | A * | 4/1991 | White | F16L 1/26 138/106 |
| 7,257,909 | B2 * | 8/2007 | Shaffer | E01H 1/056 37/232 |
| 2005/0011051 | A1 * | 1/2005 | Bosa | A01B 1/026 294/58 |

OTHER PUBLICATIONS

U.S. Appl. No. 13/483,986, filed May 30, 2012. (34 Pages).

* cited by examiner

*Primary Examiner* — John C Hong
(74) *Attorney, Agent, or Firm* — Karen R. DiDomenicis

(57) ABSTRACT

Disclosed is a deconstructable water storage tank assembled using modular components including wall panels, a base ring and a membrane for use in large volume fluid transfer operations such as hydraulic fracturing. Also disclosed are methods and tools for assembling the tank for use at a first hydraulic fracturing site, and disassembling and transporting the tank components for redeployment at a second hydraulic fracturing site. A fluid management system is also disclosed utilizing the deconstructable storage tank.

4 Claims, 18 Drawing Sheets

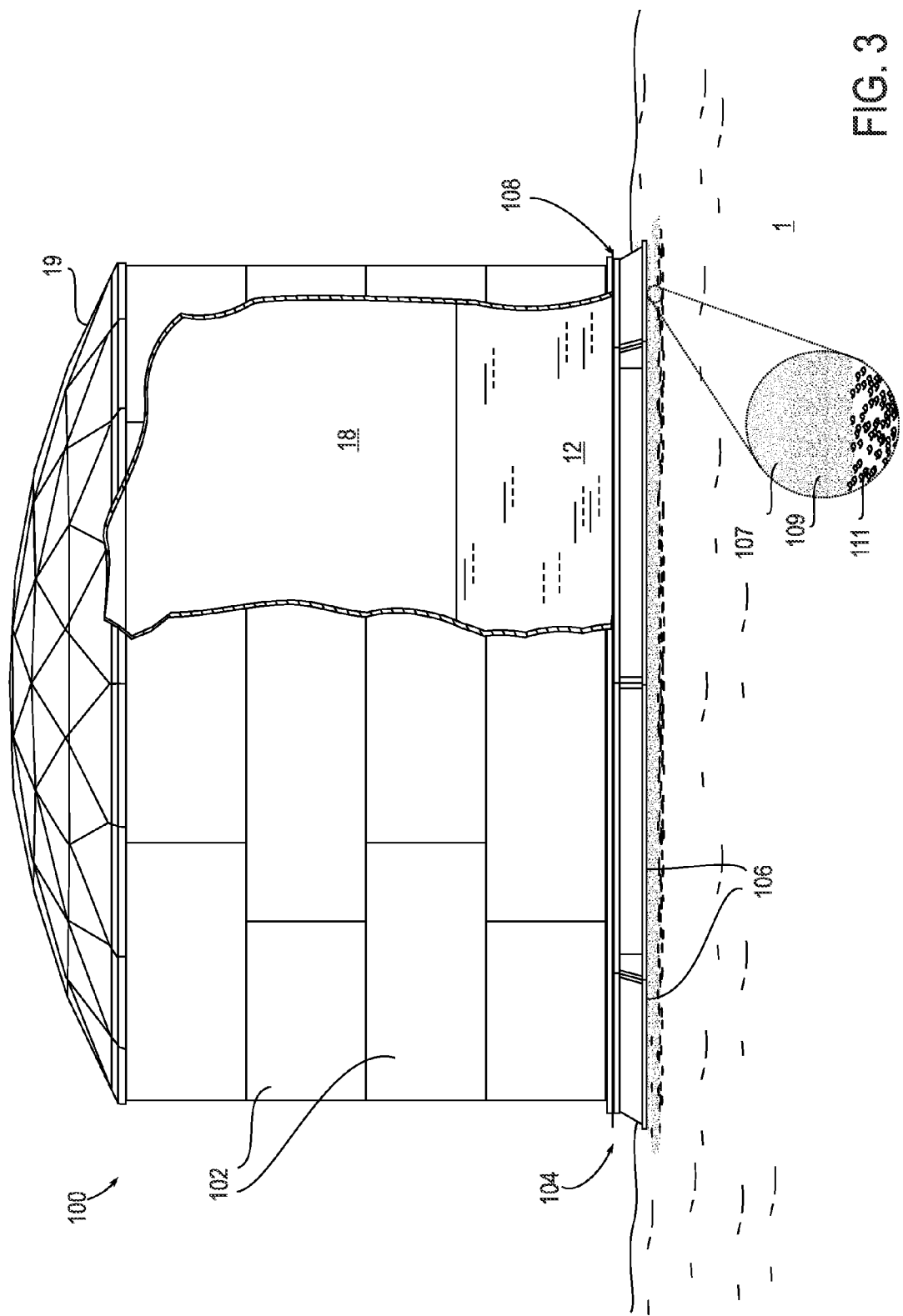

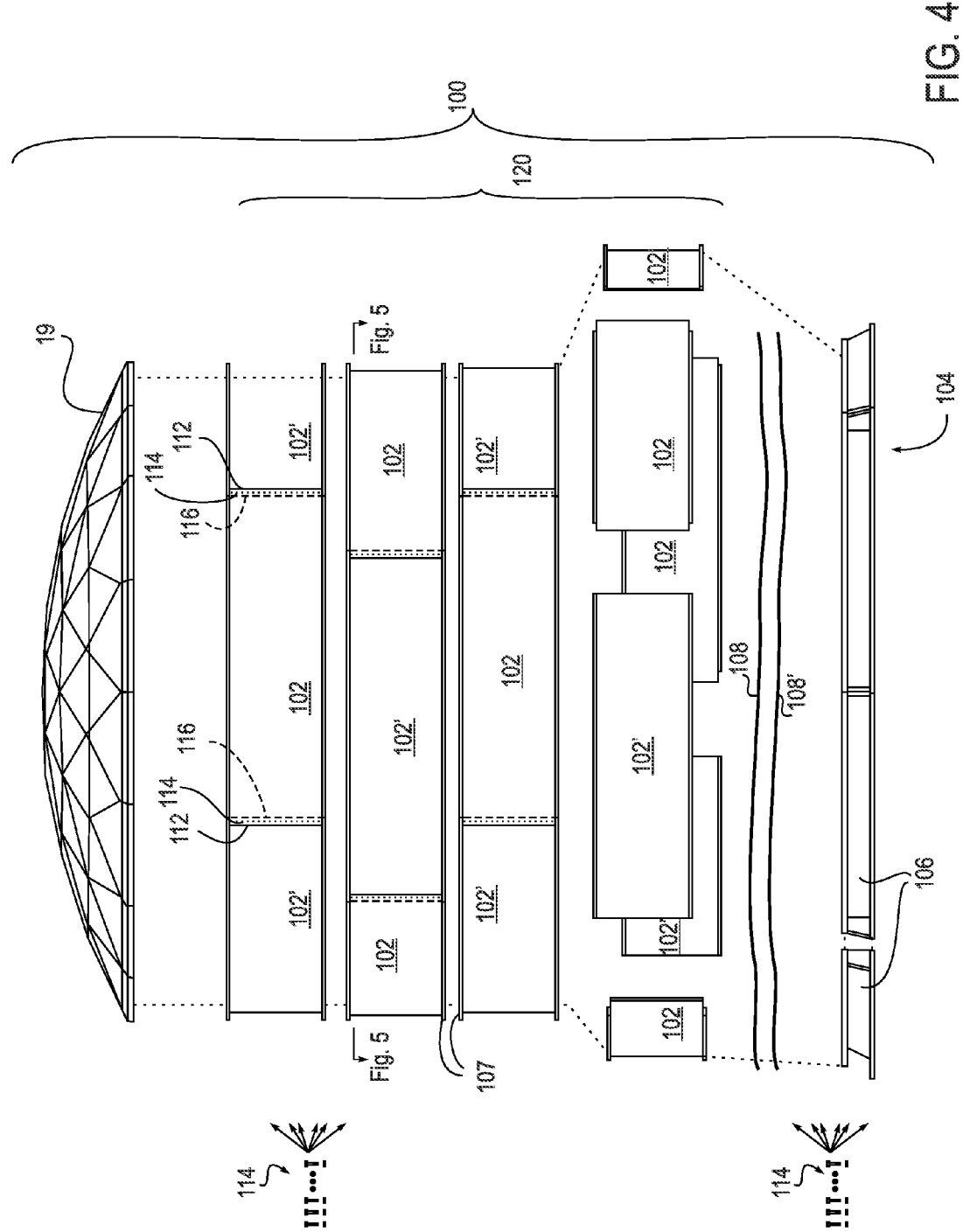

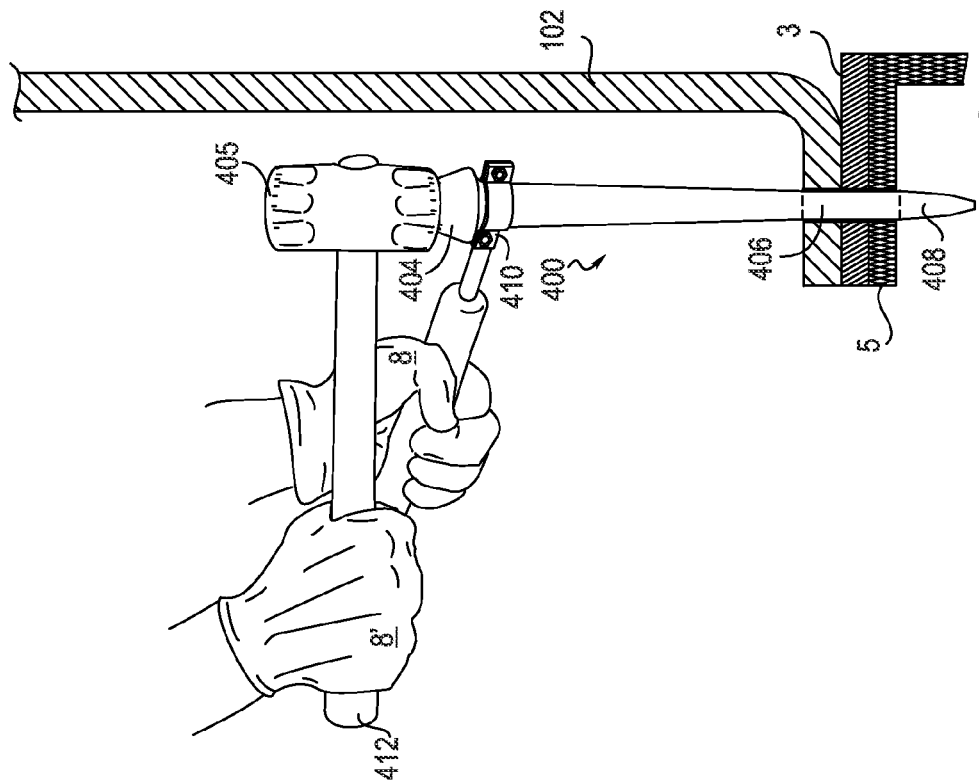
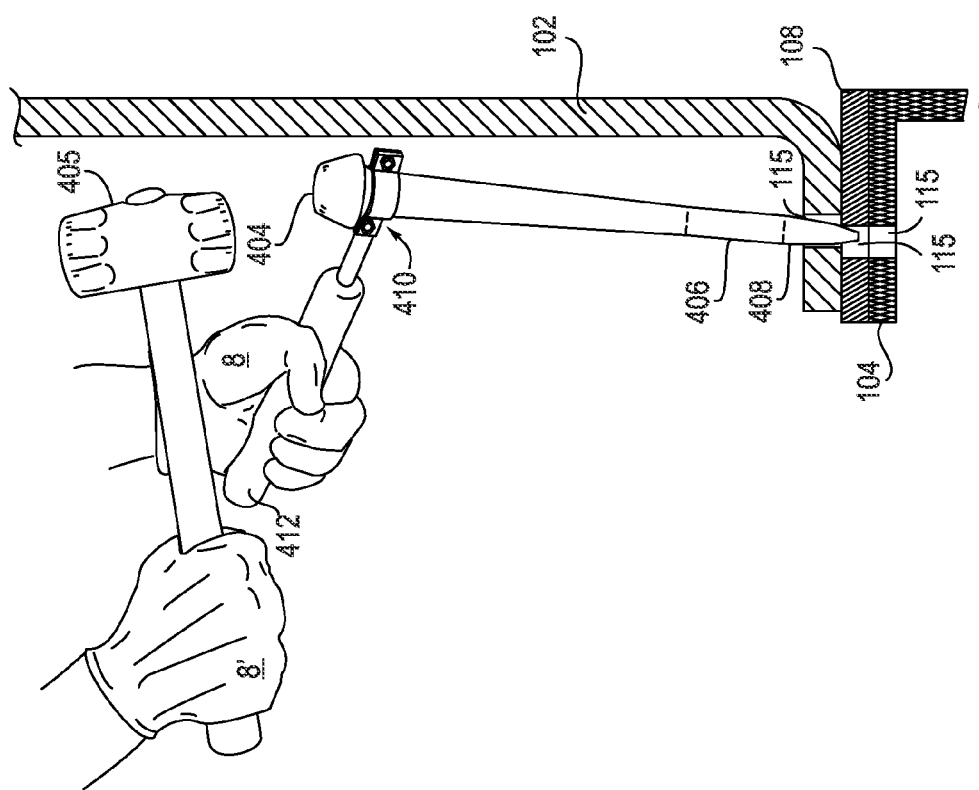

US 9,285,202 B2

MODULAR TANK CONSTRUCTION AND DECONSTRUCTION METHODS AND TOOLS FOR USE THEREIN

This is a continuation-in-part of U.S. patent application Ser. No. 13/483,986 which was filed on Mar. 30, 2012.

FIELD

The present disclosure relates to methods for constructing and deconstructing modular storage tanks for use in high volume fluid transfer operations such as hydraulic fracturing to produce natural gas from shale.

BACKGROUND

In high volume fluid transfer operations, such as hydraulic fracturing to produce natural gas from shale, large amounts of water are required to be stored and managed. For instance, several millions of gallons of water can be required for hydraulic fracturing at a single well. Water is stored on site near the well, and is blended with a proppant material such as sand to form a slurry which is injected into the well and into the shale formation, thus opening the shale formation to allow natural gas or oil to flow. Water is returned from the shale through the well to the surface in the form of flowback water. This water can then be treated to remove contaminants and reused at additional well sites.

A limited number of options are currently available to manage water storage at a well site. According to one currently available option, many 500 barrel (bbl) storage tanks are rented for the duration of hydraulic fracturing and flowback operations at a particular well. The use of such tanks results in very large well pad area requirements, which is undesirable from land use, environmental and aesthetic perspectives. Such tanks are furthermore difficult to clean and expensive to rent.

A second currently available option for managing water storage in hydraulic fracturing operations is the use of large deconstructable water storage tanks, such as 25,000 bbl deconstructable water storage tanks. One such tank 10 having an interior 18 for storing hydraulic fracturing fluid 12 is illustrated in FIG. 1. Such tanks are typically 15 foot (4.6 m) high structures made up of steel panels 16. The tanks are typically lined with a polyvinyl chloride (PVC) or polypropylene (PP) bag or liner. These are expensive to rent and also result in very large well pad requirements. The tank may rest on a cement pad 14 in the ground 1. The liners can present difficulties for disposal, and the liners can also be inadvertently sucked into pumps that remove water from the tank during operation. Such tanks do not meet American Water Works Association (AWWA) seismic code and must be built at lower heights to meet 100 mph wind code. Furthermore, it can be difficult to place this type of tank with secondary water containment.

A third currently available option used to manage water storage in hydraulic fracturing operations is illustrated in FIG. 2. Open ponds or pits 20 such as 25,000 bbl pits are lined with PVC or PP liners 22. Such pits have a maximum depth of 15 feet (4.6 m) indicated at 92, and have slope requirements indicated at 80 of no more than 3:1 (horizontal:vertical). Such pits therefore result in large well pad requirements. As indicated by 90, 6 typical tank widths 10 can fit within one such pond 20. Such pits typically require fencing or other barriers to prevent unauthorized entry. Double liners can be used to reduce the likelihood of leakage, but this adds to the cost. Furthermore, open pits for flowback water may be aesthetically unappealing.

The need remains for improved water storage management in high volume fluid transfer operations such as hydraulic fracturing. It would be desirable to have a system which would not require a large well pad area and which could be easily assembled, disassembled and transported to multiple well sites. It would further be desirable for the system to meet American Water Works Association (AWWA) specifications, seismic code, wind load code and increased water storage.

SUMMARY

In one aspect, a bolt hole alignment tool is provided for aligning holes in at least two structural components to be joined. The tool includes an elongated bar having two ends and having a first tapered portion at one end, a strikeable head portion at the other end, a non-tapered cylindrical portion adjacent the first tapered portion and a second tapered portion adjacent and between the non-tapered cylindrical portion and the strikeable head portion; and a handle secured to the second tapered portion of the elongated bar. The handle can be capable of pivoting between a collapsed nonusage position and a usage position at an angle of approximately 90° from the elongated bar.

In another aspect, a first bolt positioning tool for use in constructing a deconstructable tank for storing fluid used in hydraulic fracturing operations or other high volume fluid transfer operations is provided, including an elongated rod having two ends and having a bolt holding block fixed at one end and a handle at the other end; a fulcrum supporting the elongated rod between the bolt holding block and the handle; and a mounting fixture for securing the elongated rod to the fulcrum.

In another aspect, a second bolt positioning tool is provided, including a bolt holding block having a shape to partially enclose a bolt head and having a magnet therein for holding a bolt head therein; and a handle attached to the bolt holding block.

In another aspect, a method is provided for aligning holes in at least two structural components to be joined. The method includes positioning at least two structural components to be joined each having bolt holes there through such that at least a portion of the bolt holes are aligned; inserting the first tapered portion of the bolt hole alignment tool into the aligned bolt holes of the at least two structural components; and while holding the handle of the bolt hole alignment tool, striking the strikeable head portion of the bolt hole alignment tool such that the non-tapered cylindrical portion is driven into the aligned bolt holes and the second tapered portion is not driven into the aligned bolt holes.

In another aspect, a method is provided for positioning a bolt to join at least two structural components having bolt holes there through. The method includes positioning the at least two structural components such that the bolt holes there through are aligned; placing a bolt in the bolt holding block of the first bolt positioning tool; positioning the bolt positioning tool near the aligned bolt holes such that the fulcrum rests on a substantially horizontal surface; and operating the handle to insert the bolt placed in the bolt holding block through the aligned bolt holes.

In another aspect, a method is provided for deploying a deconstructable tank for storing fluid used in hydraulic fracturing operations or other high volume fluid transfer operations utilizing the bolt hole alignment tool and the first and second bolt positioning tools disclosed herein. A plurality of base ring pieces is attached to one another to form a base ring having a circular cross section and a top horizontal portion comprising bolt holes. The base ring is set in a predetermined location. A membrane is placed over the base ring. A series of curved panels is sequentially positioned in cooperating arrangement to form a first horizontal band wherein the curved panels are attached to one another and to the base ring. The first horizontal band has an upper horizontal portion comprising bolt holes and a lower horizontal portion comprising bolt holes. The bolt holes of the top horizontal portion of the base ring are aligned with the bolt holes of the lower horizontal portion of the first horizontal band by inserting the first tapered portion of the bolt hole alignment tool into the aligned bolt holes. Each bolt is placed in the bolt holding block of the first bolt positioning tool and first bolt positioning tool is used to position bolts through the desired bolt holes. Nuts are affixed to the bolts thereby attaching the first horizontal band to the base ring. Additional series of curved panels are sequentially positioned in cooperating arrangement to form additional horizontal bands, which in turn are similarly attached to the first and optional subsequent horizontal band(s), thus forming a cylindrical tank wall of a desired height. The second bolt positioning tool is used to position bolts through the desired bolt holes during attachment of the additional horizontal bands.

DESCRIPTION OF THE DRAWINGS

These and other objects, features and advantages of the present invention will become better understood with reference to the following description, appended claims and accompanying drawings where:

FIG. 3 is a cutaway front view of a fluid storage tank according to one exemplary embodiment.

FIG. 4 is an exploded view of a fluid storage tank according to one exemplary embodiment.

FIGS. 15A-15B are illustrations of the use of an alignment tool according to one exemplary embodiment.

DETAILED DESCRIPTION

Figure 1:
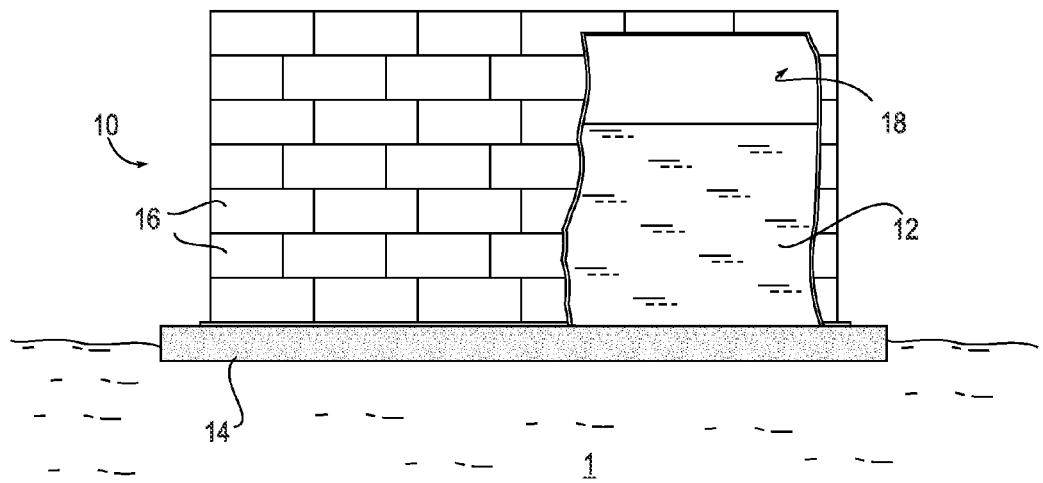
FIG. 1 is a cutaway front view of a fluid storage tank according to the prior art.
Figure 2:
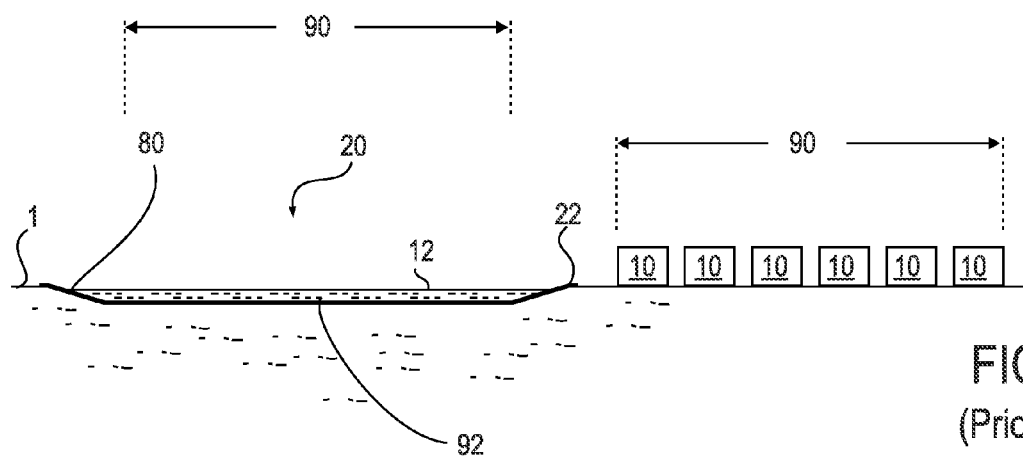
FIG. 2 is a cross-sectional side view of a fluid storage pit according to the prior art.

A deconstructable tank 100 for storing fluid 12 used in hydraulic fracturing operations or other high-volume fluid transfer operations is illustrated in FIG. 3. As can be seen, the deconstructable tank 100 includes a base ring 104 also referred to herein as a base plate 104 having a circular cross section. The base ring 104 provides vertical stability for the tank wall and serves as half of a capture flange for capturing a floor membrane. The tank has a cylindrical wall made up of multiple horizontal bands with chimes or flanges attached to one another. The lowermost horizontal band is attached to the base ring. Each horizontal band is made up of a plurality of curved panels 102 attached to one another at lap joints.

In one embodiment, a membrane 108 located between the lowermost horizontal band and the base ring 104 forms the floor of the tank. In this embodiment, the deconstructable tank 100 advantageously does not require a concrete base foundation or floor or other rigid steel floor plating. Suitable membrane materials include sheet materials such as polyvinyl chloride (PVC), polypropylene (PP), linear low-density polyethylene (LLDPE) and high-density polyethylene (HDPE) sheet. It may be advantageous to use to layers of membrane material. The membrane 108 can be reinforced for increased durability. Reinforced PVC having thickness of 40 mils (4.6 mm) is an example of a suitable membrane material. In other embodiments, the tank floor can be a concrete base foundation or rigid steel floor plating.

The cylindrical tank wall of the deconstructable tank has a height of at least 15 feet (4.57 m), even at least 30 feet (9.14 m) and even at least 40 feet (12.2 m). Each of the curved panels 102 has a height of at least 9 feet (2.7 m). The curved panels 102, also referred to as wall panels 102, are formed from carbon steel. The degree of curvature or arc of each panel can vary depending on the number of panels used to form the round cross-sectional wall of the tank.

The curved panels 102 are advantageously significantly larger than wall panels used in prior art tanks. For example, a prior art 1,000,000 gallon storage tank 10 such as that illustrated in FIG. 1 is made up of 389 wall panels 16 wherein each panel is 5 feet high by 9 feet wide (1.5 m by 2.7 m). By contrast, a 1,000,000 gallon storage tank 100 according to the present disclosure is made up of 24 panels 102 that are 9 feet high by 37 feet wide (2.7 m by 11.3 m), resulting in a tank that is 36 feet (11.0 m) in height and 71 feet (21.6 m) in diameter. This reduction in the number of wall panels 102 results in a significant reduction in time to assemble the tank 100, from about 25 days to about four days. Additionally, the number of through wall bolts connecting the wall panels is greatly reduced. In this example, the number of through wall bolts is reduced by 90%, greatly reducing the risk of leaks through the tank wall. A minimum number of bolts necessary to meet appropriate industry codes, such as American Water Works Association (AWWA) D103-09 seismic code (Ss=10.6%, SI=5.3%, Seismic Use Group=3) and 100 mph wind load can be calculated based on the amount of stress on the bolts and the amount of mass in the tank.

Advantageously, the deconstructable tank 100 has a volumetric capacity of at least 200,000 gallons (760 cubic meters), even at least 1 million gallons (3800 cubic meters).

The deconstructable tank 100 can also include a roof 19, such as a domed roof or any other roof which can be attached to the uppermost horizontal band. Alternatively, a floating roof can be used. Advantageously, the domed roof can include a vent.

The deconstructable tank can optionally be equipped with an aerator connected with a compressed air supply within the deconstructable tank to avoid density striations within the fluid in the tank, to avoid microbial activity and to avoid freezing in the winter.

The deconstructable tank can also optionally be equipped with a float gauge for monitoring the fluid level within the tank, detectors for lower explosion limit (LEL) monitoring, hydrogen sulfide monitoring, and the like. The tank can be equipped with additional accessories as would be apparent to one skilled in the art.

The deconstructable tank can also optionally be equipped with one or more manways in the tank wall through which a person can enter the tank for the purposes of cleaning.

The deconstructable tank 100 can easily be deployed in one location, e.g., a hydraulic fracturing site, and later disassembled, transported and redeployed in a second location. The base ring pieces 106, wall panels 102, membranes 108 and other components are sized to be transportable by at least one transportation vehicle via roadway without the need for special permitting for wide loads and the like.

To assemble the tank 100, at a predetermined location, a support surface is prepared onto which the base ring 104 will be set. The support surface is prepared by excavating the ground 1 onto which the base ring will be set. The depth of excavation will depend on the soil loading pressure as determined by a soil survey. This can vary between a few inches and a few feet. Engineered fill is placed into the excavated area. In some embodiments, the engineered fill is placed in sequential layers, with a bottom layer of coarse fill material 111, followed by finer gravel 109 and finally sand 107.

Figure 6A:
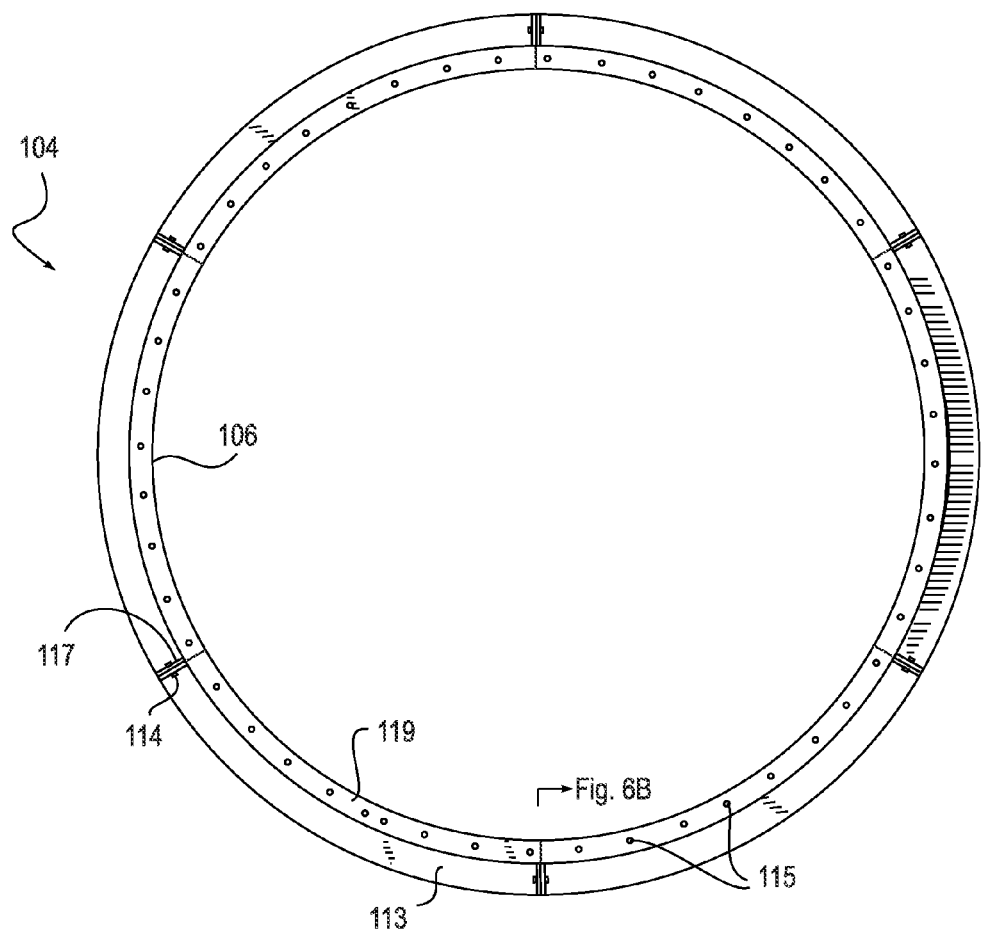
FIG. 6A is a top view of a fluid storage tank base ring according to one exemplary embodiment.
Figure 6B:
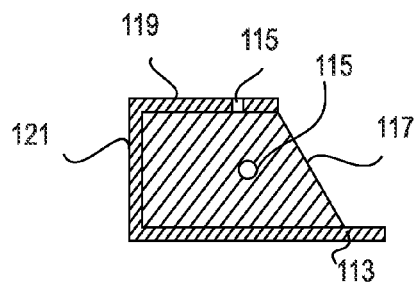
FIG. 6B is a side view of a base ring segment used in the base ring of FIG. 6A.
Figure 6C:
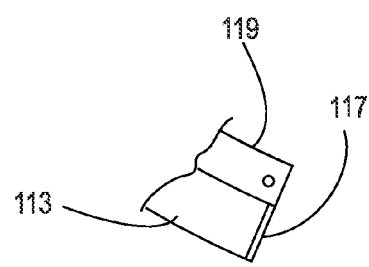
FIG. 6C is a top view of a base ring segment used in the base ring of FIG. 6A.

The appropriate number of base ring pieces 106, illustrated in FIGS. 3, 4 and 6A, are attached to one another to form the base ring 104 which is set in place on the support surface. As can be seen in the side view of FIG. 6B, in one embodiment, the base ring pieces are gusseted, i.e., having a top portion 119 and a bottom portion 113. The top portion 119 of the base ring, also referred to as the top of the base plate or the top horizontal portion of the base plate, forms the bottom half of a flange having holes 115 through which bolts 114 are inserted to attach the lowermost horizontal band 102 to the base ring 104. As seen in FIG. 4, the wall panels 102 have upper and lower edges 107. The lower edge of the wall panels making up the first horizontal band form the top half of the flange, and are attached to the top portion 119 of the base ring 104. Each base ring piece 106 has two support walls 117 at either end having a bolt hole 115 there through for connection of adjacent base ring pieces 106. FIG. 6C illustrates one end of a base ring piece 106, including support wall 117, top portion 119 and bottom portion 113.

Once the base ring 104 is assembled as shown in FIG. 6A, at least one layer of membrane 108, preferably two layers, is placed over the base ring. The membrane layer(s) offer the advantages of being durable, easily transportable and easily replaced as needed.

Gaskets (not shown) are optionally included above, below and/or between the membrane layers 108. The gaskets are compressed by the bolts attaching the lowermost horizontal band to the base ring to ensure no leakage through the gasket. Gasket materials suitable for use include ethylene diene propylene monomer (EDPM), neoprene rubber and the like.

Each of a first plurality or set of curved wall panels 102 is sequentially positioned in cooperating arrangement, and attached to one another and to the base ring 104 to form a first horizontal band.

Figure 14:
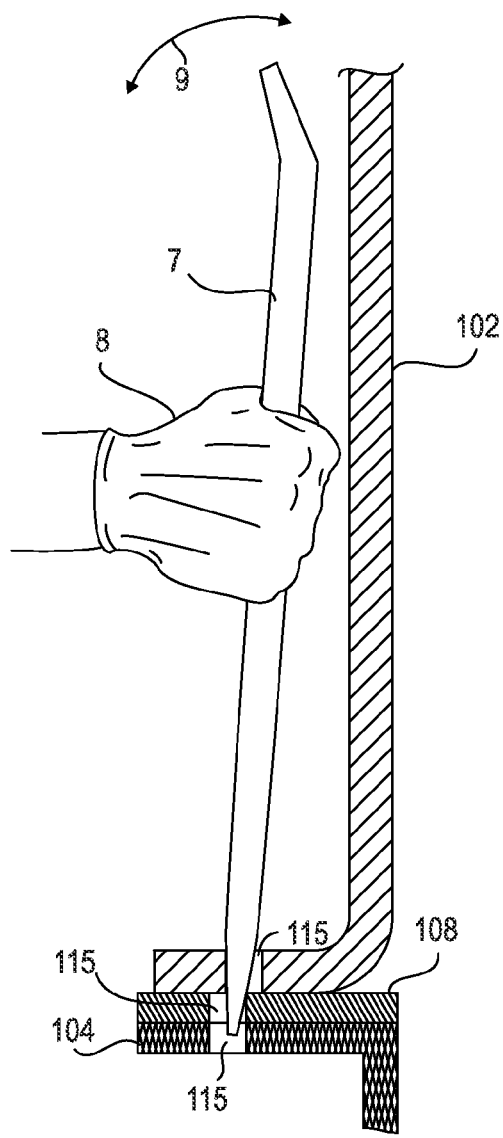
FIG. 14 is a side view of an alignment tool according to the prior art.

The curved wall panels 102 are held upright in position by a crane or other suitable means while the bolt holes 115 of the wall panels 102 are aligned with the bolt holes 115 of the base ring 104. According to the prior art, as shown in FIG. 14, a tapered bar 7 is used to pry the tank components to be joined, namely wall panel 102, gasket 108 and base ring 104, such that the bolt holes 115 are aligned with each other. The user holds the bar 7 by hand 8 and inserts the tapered end of the bar 7 into the uppermost bolt hole 115, and moves the tapered bar 7 over an angle 9 to force the alignment of the bolt holes 115 of the wall panel 102, gasket 108 and base ring 104. Over time this has been found to damage the bolt holes 115 of these reusable tank components.

Figure 13:
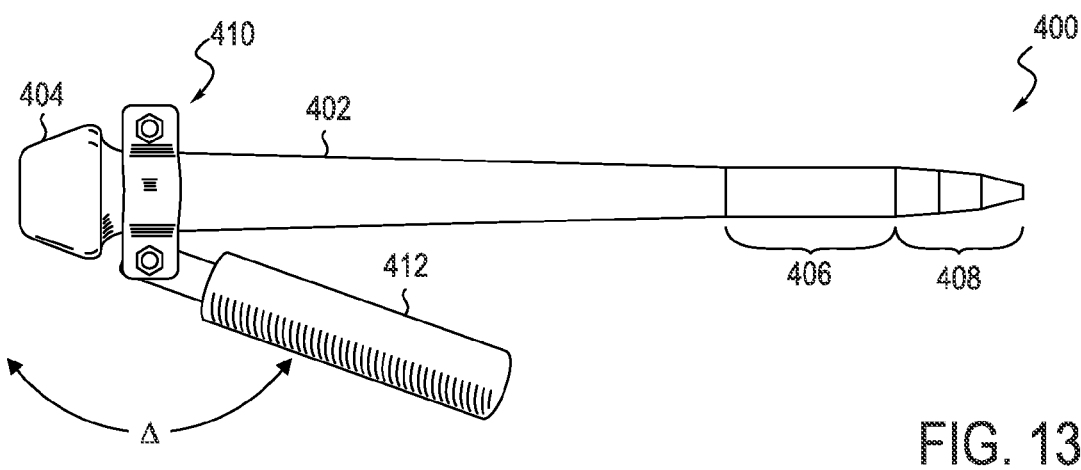
FIG. 13 is a side view of an alignment tool according to one exemplary embodiment.

FIG. 13 illustrates an improved bolt hole alignment tool 400. The bolt hole alignment tool includes an elongated bar having two ends. At one end is a strikeable head portion 404. At the other end is a first tapered portion 408. Adjacent the first tapered portion 408 is a non-tapered cylindrical portion 406. A second tapered portion 402 is adjacent and between the non-tapered cylindrical portion 406 and the strikeable head portion 404. A handle 412 is secured to the second tapered portion 402. In one embodiment, the handle is capable of pivoting between a collapsed nonusage position (as in FIG. 13) and a usage position at an angle of approximately 90° from the elongated bar (as in FIGS. 15A-B). In one embodiment, the handle 412 is attached in such a way by the use of a clamp 410.

FIGS. 15A-B illustrate a method of using the bolt hole alignment tool 400 to align the bolt holes 115 of the wall panel 102, gasket 108 and base ring 104. As shown in FIG. 15A, first while the user holds the handle 412 in the usage position in one hand 8, the first tapered portion 408 of the tool is inserted into the uppermost bolt hole 115 of the tank components to be joined. The user then strikes the strikeable head portion 404 of the tool with the other hand 8' using a mallet 405 or the like until the non-tapered cylindrical portion 406 just occupies the bolt holes 115 of the wall panel 102, gasket 108 and base ring 104, and the second tapered portion 402 is not driven into the aligned bolt holes. By not driving the second tapered portion 402 into the aligned bolt holes, damage to the reusable tank components can be avoided.

Figure 16:
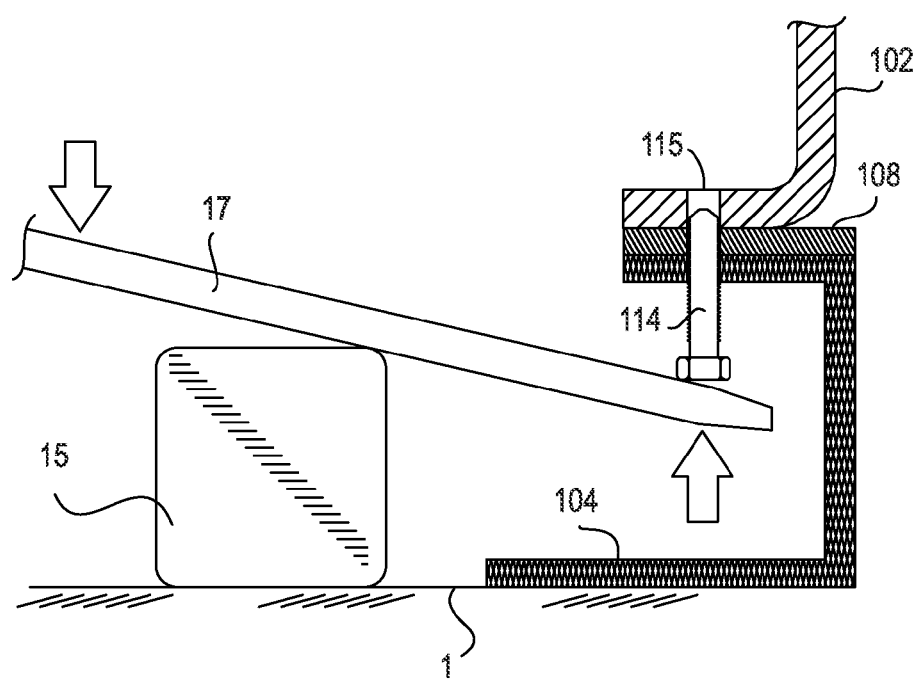
FIG. 16 is a side view of a bolt positioning tool according to the prior art.

FIG. 16 illustrates a prior art method for positioning a bolt 114 to join at least two structural components having bolt holes 115 there through (shown are the wall panel 102, gasket 108 and base ring 104). A block 15 is laid on the ground 1 near the base ring 104, and a bar 17 pivots on the upper edge of the block 15 nearer the base ring 104. A bolt 114 is placed on one end of the bar 17 and the bar 17 is pressed down at the other end to push the bolt 114 through the aligned bolt holes 115. This method has been found to be difficult to control, such that positioning of the bolts is imprecise.

Figure 17:
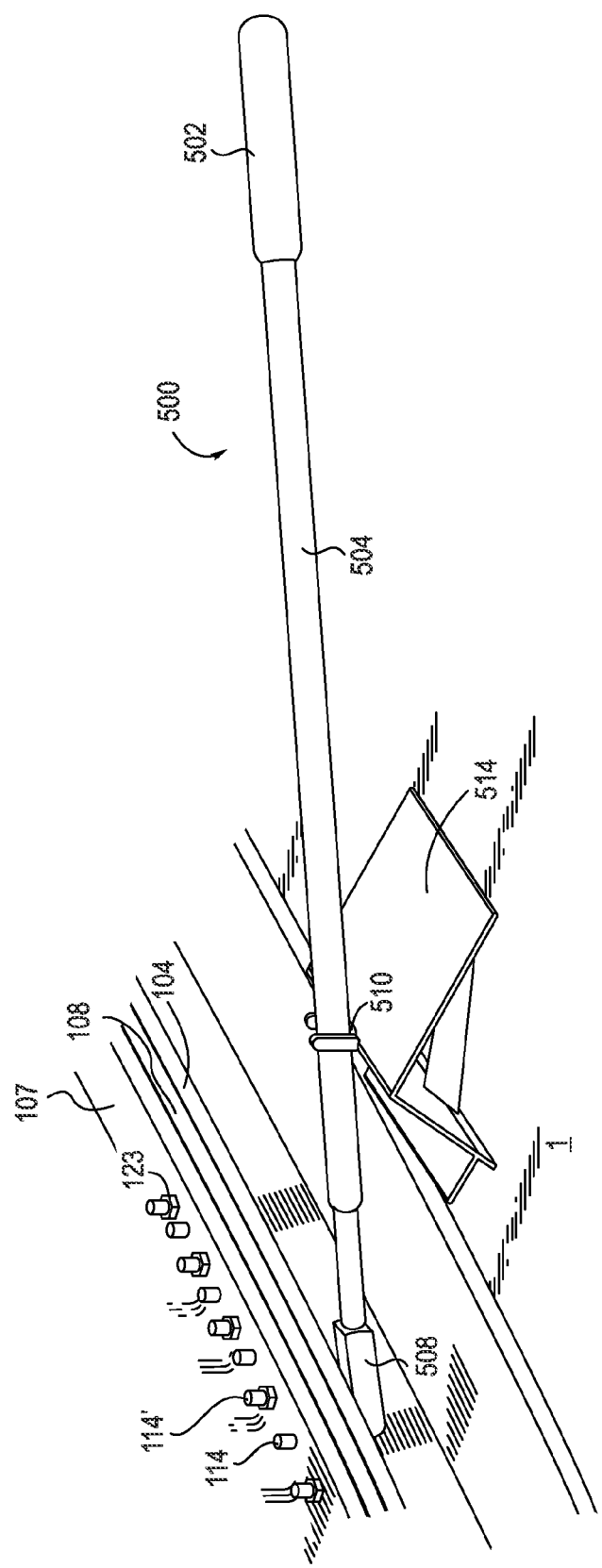
FIG. 17 is a side view of a bolt positioning tool according to one exemplary embodiment.

FIG. 17 illustrates a bolt positioning tool 500 and a method for positioning a bolt 114 to join at least two structural components having bolt holes 115 there through (shown are the wall panel 102, gasket 108 and base ring 104). The bolt positioning tool 500 has an elongated rod 504 having bolt holding block 508 fixed at one end and a handle 502 at the other end. A fulcrum 514 supports the elongated rod 504 between the bolt holding block 508 and the handle 502. A mounting fixture 510 secures the elongated rod 504 to the fulcrum 514.

In one embodiment, first a bolt 114 is placed in the bolt holding block 508 of the bolt positioning tool 500. The bolt positioning tool 500 is positioned near the base ring 104 such that the bolt holding block 508 is positioned directly beneath the intended aligned bolt holes of the wall panel 102, optional gasket 108 and base ring 104. The fulcrum 514 rests on a substantially horizontal surface, e.g., the ground 1. The handle 502 is then operated to insert the bolt 114 placed in the bolt holding block 508 through the aligned bolt holes. Nuts 123 can then be affixed to the upward facing threads of the bolts 114.

Figure 5A:
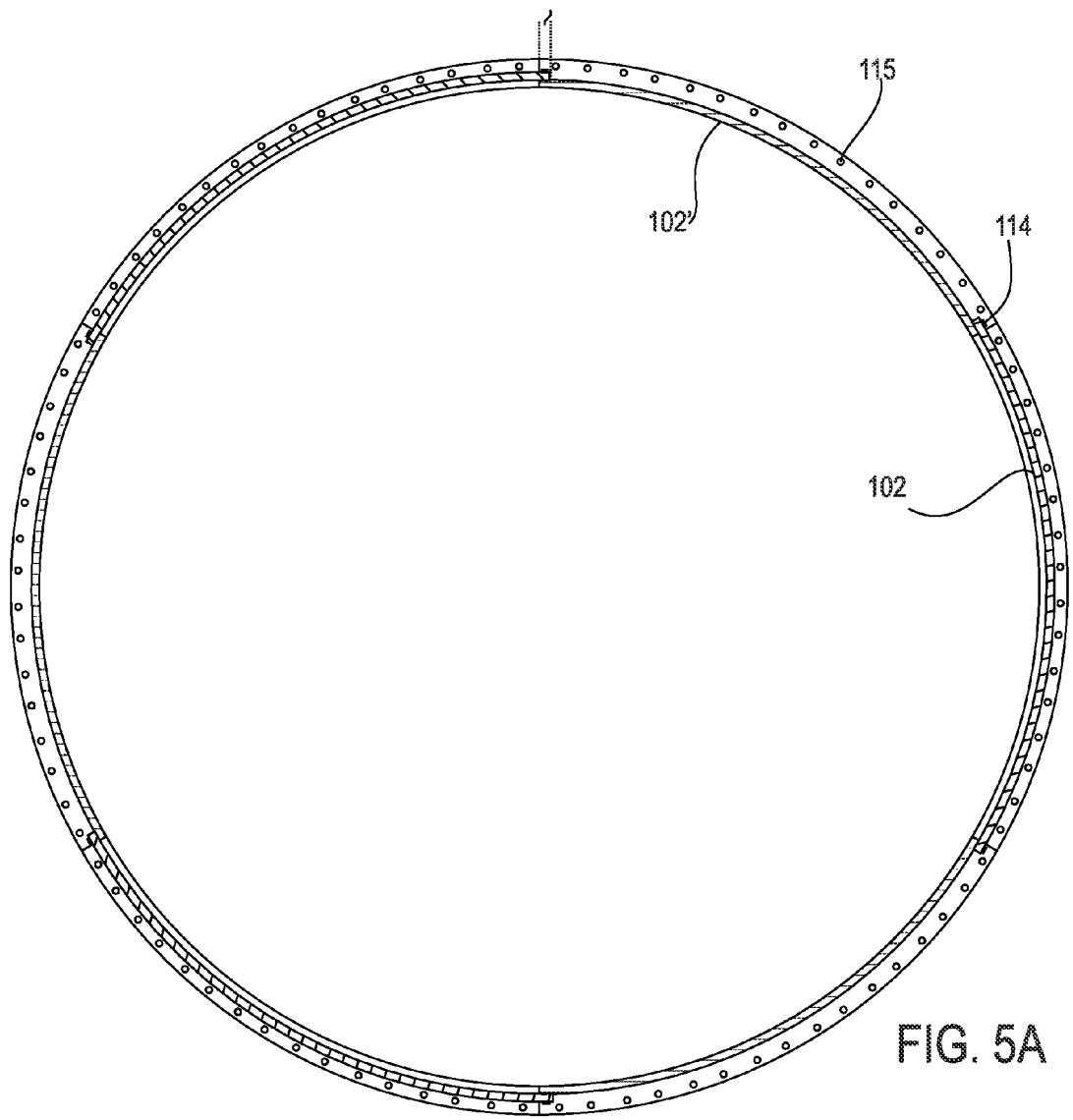
FIG. 5A is a cross-sectional top view of a fluid storage tank wall according to one exemplary embodiment.
Figure 7:
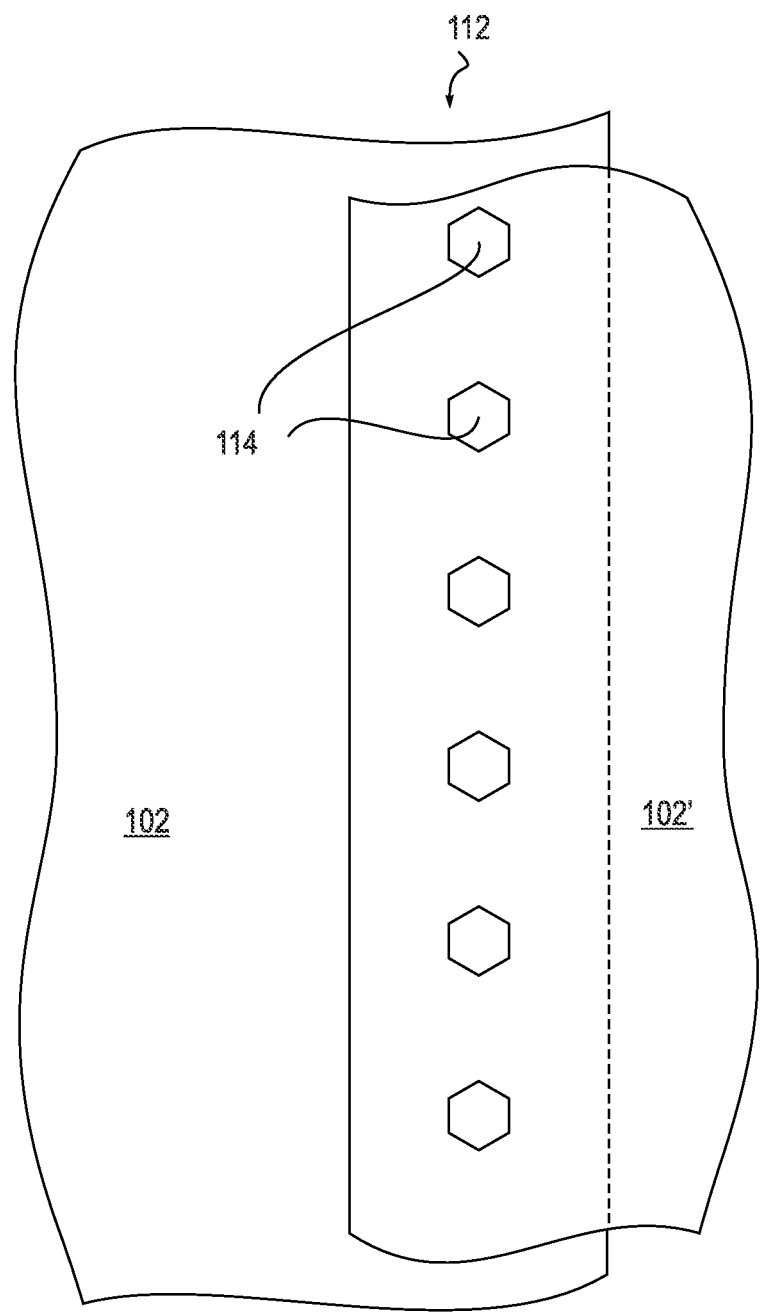
FIG. 7 is a detailed view of a seam between two overlapping panels in the fluid storage tank wall of FIG. 5A.

Referring to FIG. 4, curved wall panels 102 which are adjacent to each other horizontally can be attached to one another using through wall bolts 114 through lap joints made up of an overlap 112 and an underlap 116 at each of the vertical seams between adjacent panels 102. Because of the alternating underlap and overlap of the wall panels, adjacent wall panels alternate between more interior panels 102' and more exterior panels 102. This can also be seen in FIG. 5A illustrating a cross-sectional view of the tank wall. The vertical wall portion of panel 102' is flush with the interior of the wall, while the vertical wall portion of panel 102 is more towards the exterior of the wall. Bolt holes are shown by 115. FIG. 7 illustrates the overlap joint 112 including bolts 114 attaching adjacent panels 102 and 102'.

Figure 5B:
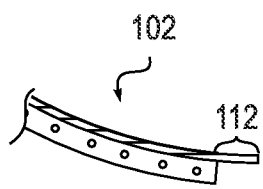
FIGS. 5B-5G are cross-sectional views of individual panels used in the fluid storage tank wall of FIG. 5A.
Figure 5C:
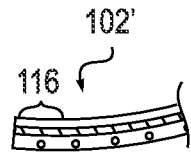
Figure 5D:
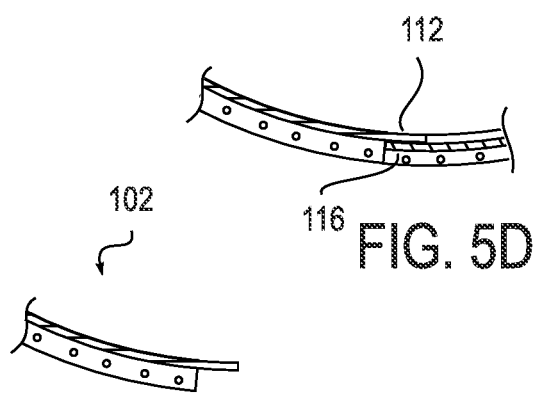

FIGS. 5B-D further illustrate this embodiment. FIG. 5B illustrates an end of one of the "exterior panels" 102 having an overlap region 112. FIG. 5C illustrates an end of one of the "interior panels" 102' having an underlap region 116. FIG. 5D illustrates the overlap joint between 102 and 102'.

Figure 5E:
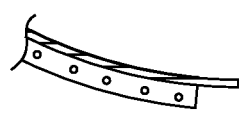
Figure 5F:
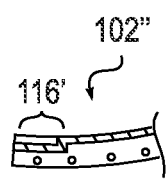
Figure 5G:
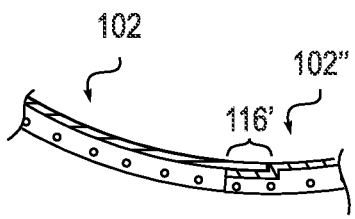

FIGS. 5E-G illustrate an alternative embodiment. FIG. 5E illustrates an end of wall panel 102 having an overlap region 112. FIG. 5F illustrates an end of a specially designed panel 102" having a recessed region 116' within the vertical portion of the wall. FIG. 5G illustrates the overlap joint between 102 and 102". As can be seen from FIG. 5G, the interior of the tank wall is smooth in this embodiment.

The number and spacing of the bolts 114 is according to seismic code. The bottom edge of each curved wall panel 102 has a chime style edge 107, i.e., half of a flange, so that the joint between the lowermost horizontal band and the base ring is a butt joint. Once the first horizontal band is in place, each of a second plurality of curved wall panels 102 is likewise sequentially positioned to form a second horizontal band in which the curved panels are attached to one another and to the first horizontal band. Additional sets of curved panels 102 are likewise attached to form at least one additional horizontal band, to build up the tank wall 120 vertically to a desired height. Adjacent horizontal bands can be attached to one another using bolts 114 through butt joints between flanged edges 107.

Figure 18:
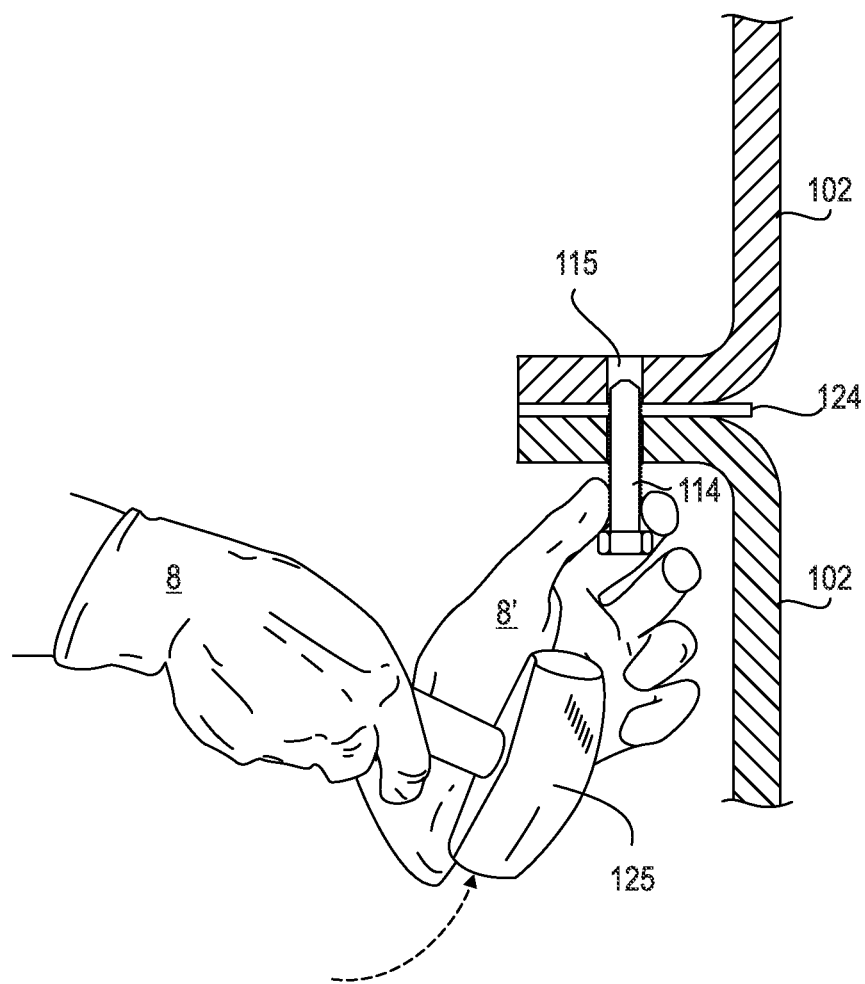
FIG. 18 is a side view of a bolt positioning method according to the prior art.

FIG. 18 illustrates a prior art method for positioning and inserting a bolt 114 to join at least two structural components having bolt holes 115 there through (shown are two adjacent wall panels 102 with optional gasket 124 there between). The user holds the bolt 114 with one hand 8' while operating a mallet 125 to strike the bolt head with the other hand 8. This method has several disadvantages, including the ease of dropping the bolt and the ease of striking the user's fingers inadvertently.

Figure 20:
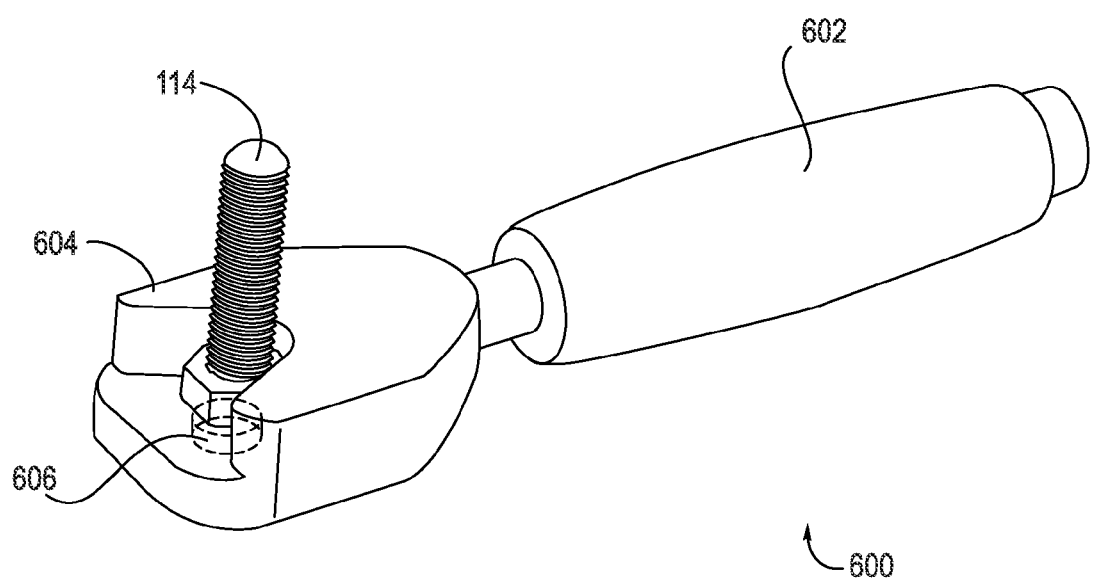
FIG. 20 is an illustration of the use of a bolt positioning tool according to one exemplary embodiment.

FIG. 20 illustrates an improved bolt positioning tool 600 for joining at least two structural components having bolt holes 115 there through. The bolt positioning tool 600 has a bolt holding block 604 having a shape to partially enclose the head of a bolt 114. The bolt holding block 604 has a magnet 606 therein for holding a bolt 114 therein. The bolt positioning tool 600 has a handle 602 attached to the bolt holding block 604.

Figure 19:
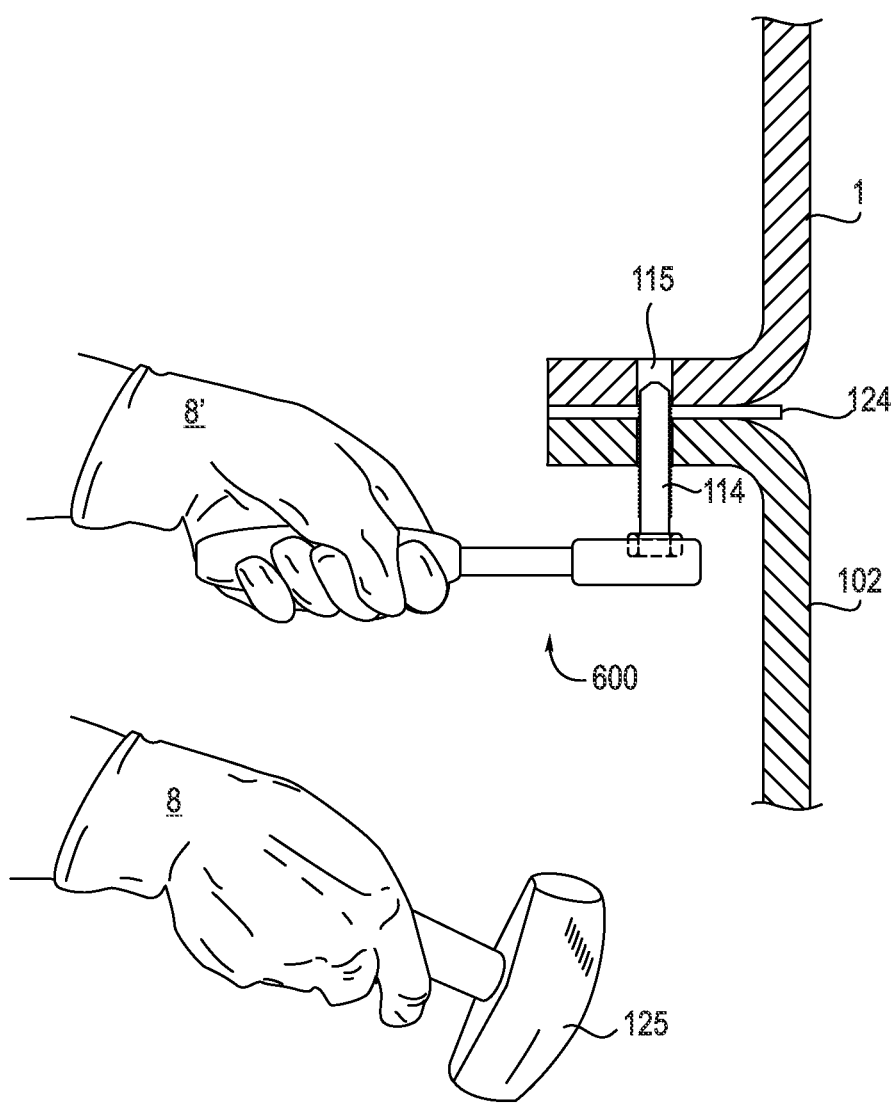
FIG. 19 is a side view of a bolt positioning tool according to one exemplary embodiment.

FIG. 19 illustrates an improved method for positioning and inserting a bolt 114 to join at least two structural components having bolt holes 115 there through (shown are two adjacent wall panels 102 with optional gasket 124 there between), using the improved bolt positioning tool 600. In one embodiment, first a bolt 114 is placed in the bolt holding block 604 of the bolt positioning tool 600. The bolt positioning tool 600 is positioned such that the bolt holding block 604 is positioned directly beneath the intended aligned bolt holes of the wall panels 102 and optional gasket 108. The handle 602 is then operated to insert the bolt 114 placed in the bolt holding block 604 through the aligned bolt holes. A nut (not shown) can then be affixed to the upward facing threads of the bolt 114. The bolt positioning tool 600 can also be used to remove bolts 114 during disassembly of components, e.g., later deconstruction of the tank.

Figure 8:
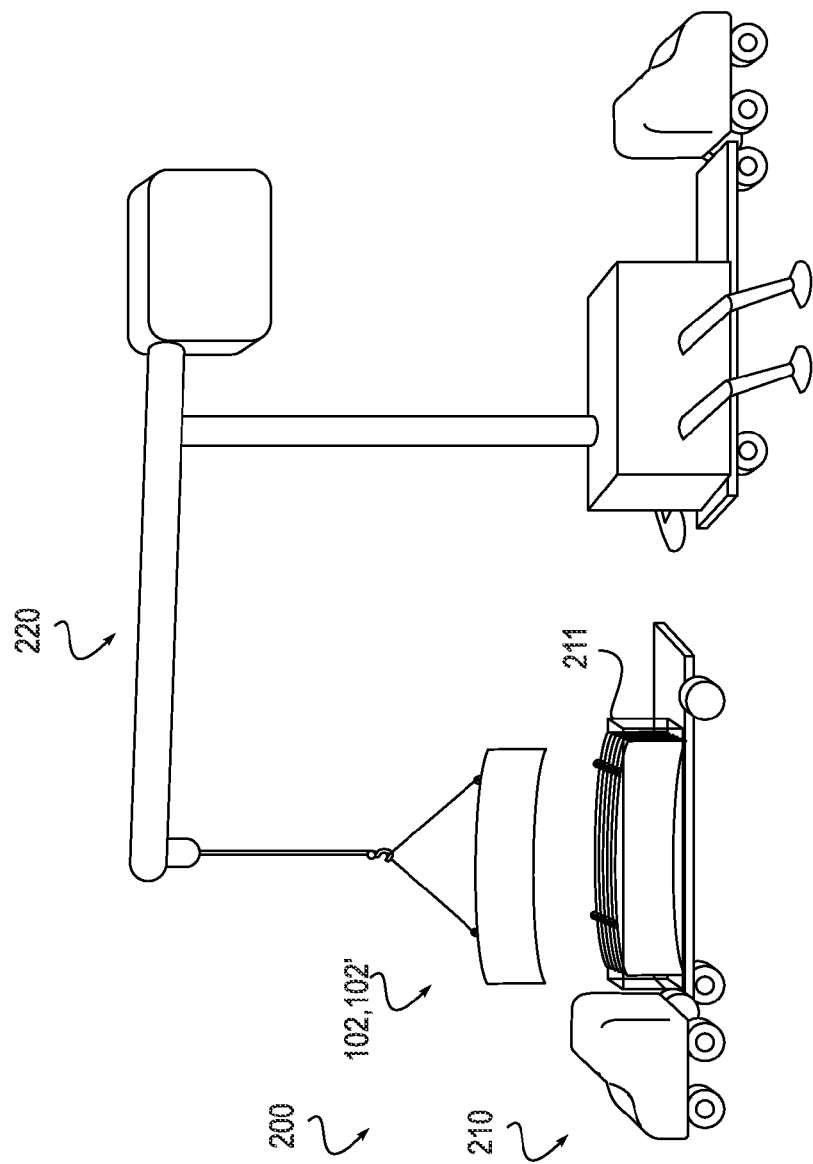
FIG. 8 is an illustration of a crane lifting a fluid storage tank wall panel according to one exemplary embodiment.

As shown in the operation 200 illustrated in FIG. 8, during the assembly of the tank 100, each panel 102, 102' is lifted by a crane 220. In the illustration of FIG. 8, the crane is lifting each panel 102, 102' in a crate 211 directly from a transportation vehicle 210. Alternatively, sets of panels can be packed into a single crate 211. The crane 220 can be located near the desired predetermined tank location. Each panel 102, 102' can then be positioned by the crane 220 in its intended position relative to the base ring 104 and any other wall panels 102, 102' already installed. The crane 220 can be used to hold the panel 102, 102' in position while bolts 114 are installed attaching the panel to adjacent structures. Lifting eyes can be provided on each wall panel for enabling lifting by the crane. Optionally (not shown), a second crane can lift a second wall panel and hold the second wall panel in place adjacent the previous wall panel while the first crane continues to hold the first panel in position to facilitate attachment of adjacent panels.

All joints between adjacent components, e.g., along horizontal seams, vertical seams and at tees where horizontal and vertical seams intersect, can include gasket material (not shown). Again, suitable gasket materials include EDPM, neoprene rubber and the like. All seams and joints can also be caulked and mastic coated with sealant as would be apparent to one skilled in the art.

Figure 10:
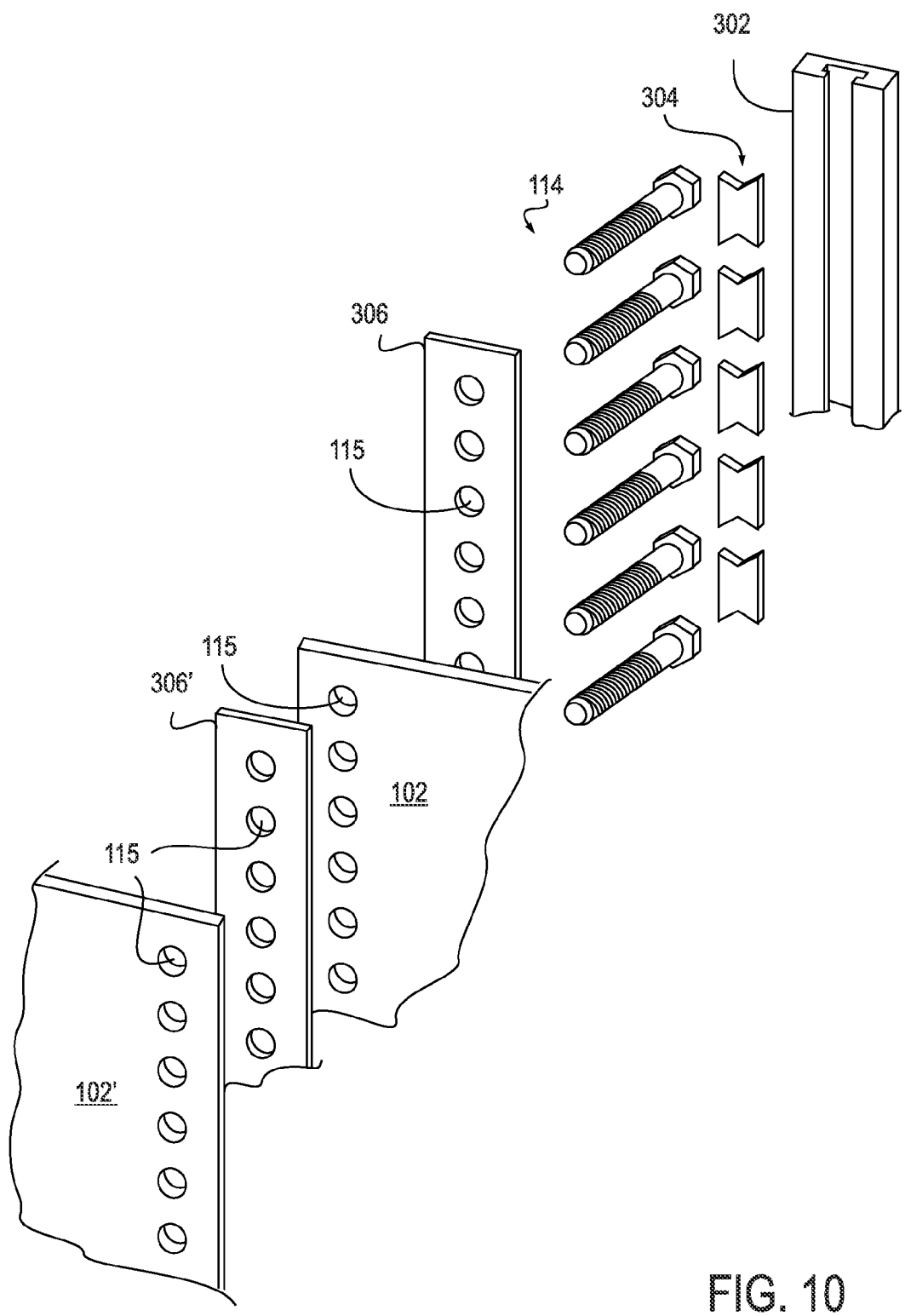
FIGS. 10-12 are an exploded view, a cross-sectional view and a front view, respectively, of a bolt capture compression plate system according to one exemplary embodiment.
Figure 11:
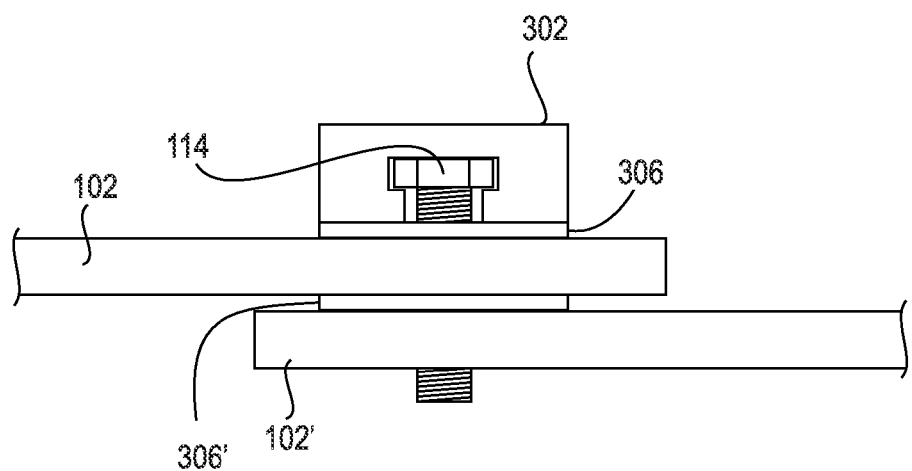
Figure 12:
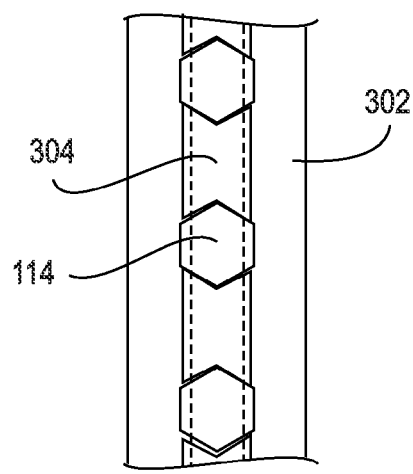

In one embodiment, a system of bolt capture compression plates is provided in the overlap joints between adjacent curved panels of each horizontal band. As illustrated in FIG. 10, a bolt capture compression plate 302 is configured to receive bolt spacers 304 and the heads of bolts 114. Gasket strips 306 and 306' can be provided with bolt holes 115 to match the spacing of the bolts 114 in the bolt capture compression plate 302 with the bolt spacers 304 there between. As shown, a gasket strip 306 is positioned between the bolt capture compression plate 302 and wall panel 102, and another gasket strip 306' is positioned between adjacent wall panels 102 and 102'. FIG. 11 is a side view of the overlap joint. FIG. 12 is a front view of the bolt capture compression plate 302, including bolts 114 with the bolt spacers 304 there between. This embodiment offers the advantage of solid gasketing along the vertical seam of the overlap joints, rather than discontinuous gasket material which can introduce the risk of leaks. The gasket strips can be any suitable gasket material, including EDPM, neoprene rubber and the like.

The deconstructable tank 100 can be disassembled easily by reversing the order of the assembly method steps. Each of the curved panels 102, 102' of the uppermost horizontal band can be sequentially unbolted and detached from each other and from the adjacent horizontal band. Next, each of the panels 102, 102' of the remaining horizontal bands can be sequentially unbolted and detached from one another and from the adjacent horizontal band or base ring 104 in the case of the lowermost horizontal band. The membrane(s) 108 can then be removed from the base ring 104. Finally, the base ring pieces 106 can be unbolted and detached from one another. All of the tank components can then be packed in at least one vehicle 210 and transported to another location, such as a second hydraulic fracturing site, for redeployment. For transport, it may be advantageous to pack into an individual crate 211 or cradle a set of wall panels 102, 102' which make up a horizontal band.

Figure 9:
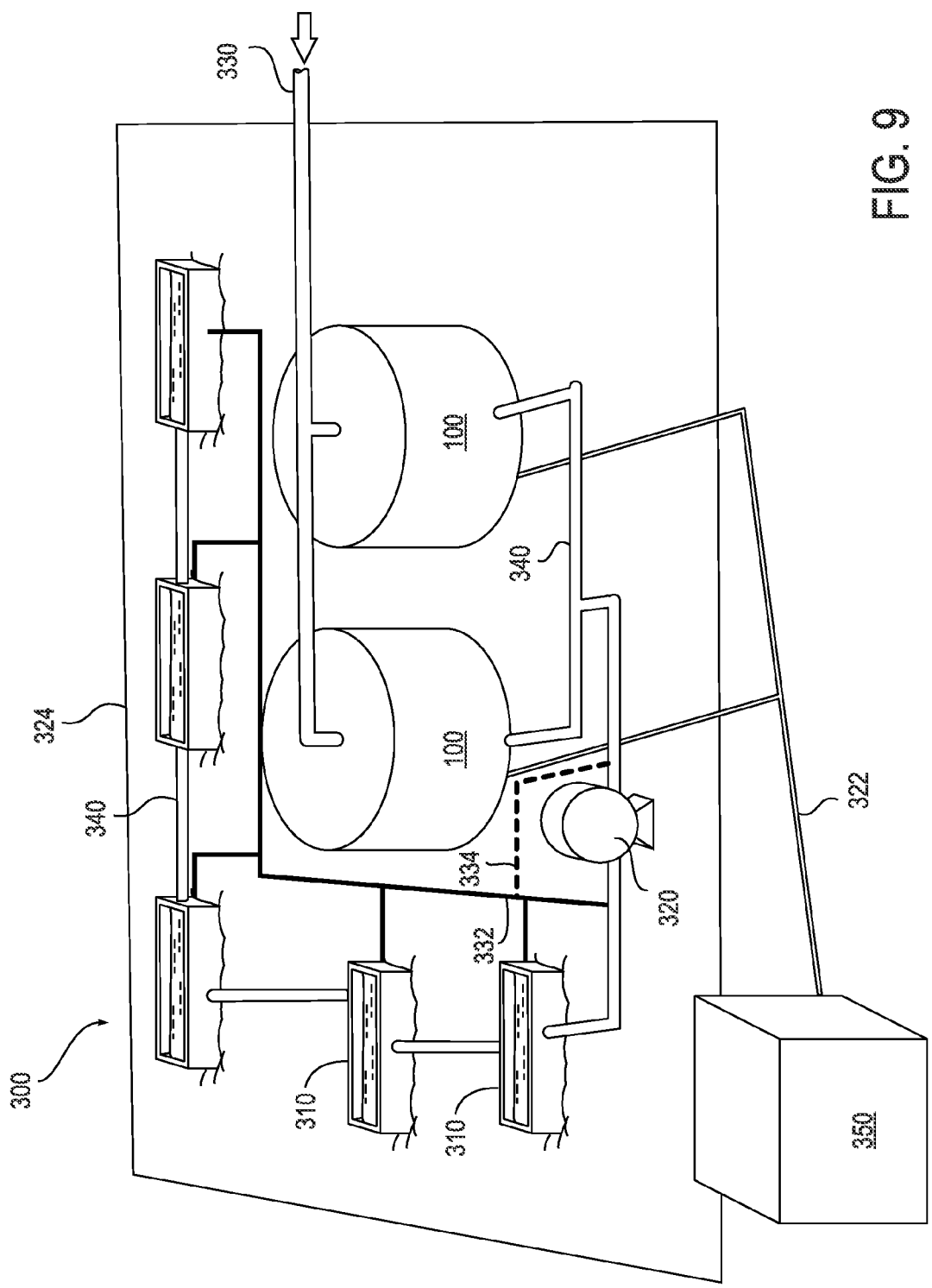
FIG. 9 is a schematic diagram illustrating a fluid management system according to one exemplary embodiment.

In one embodiment, referring to FIG. 9, a fluid management system 300 is provided for managing fluid in hydraulic fracturing operations or other high-volume fluid transfer operations. Fluid can be fed to the deconstructable tanks 100 by an inlet conduit 330 in fluid communication with the tanks 100. The inlet conduit 330 can feed fluid from the top of the tanks into the tanks via an L tube, J tube, and/or a splash plate (not shown) to eliminate erosion of the tank floor.

One or more pumps 320 can supply fluid to conduit 340 to fill the tanks 100. Alternatively, pump 320 can supply fluid to inlet conduit 332 via conduit 334 to fill the tanks 100. One or more pumps 320 can be used to pump water from truck station tanks 310, described below, into the vertical de-constructable tanks 100.

In one embodiment, the fluid management system 300 includes at least one open top container also referred to as a truck station tank 310 in fluid communication with the pump 320. Each open top container 310 can receive fluid from a fluid storage compartment on a truck or transportation vehicle (not shown), such as via a hose (not shown) attached to the fluid storage compartment on the vehicle. The open top containers 310 can be at least partially buried, or otherwise positioned so that transfer of fluid from the vehicle is assisted by gravity. In one embodiment, each open top container 310 is approximately 8 feet wide (2.4 m) by 33 feet long (10.0 m) by 6 feet high (1.8 m) and can hold 235 bbl of fluid while allowing freeboard space. Two transportation vehicles can unload water at each such open top container 310 simultaneously.

The fluid management system 300 can include a recirculating line 332 between at least one of the open top containers 310 and the conduit 340 for circulating fluid to prevent freezing in the winter. Water is recirculated back into the truck station tanks to prevent freezing in the winter.

In an alternative embodiment, not shown, the fluid management system 300 can include at least one inlet (not shown) in fluid communication with the pump 320 wherein each inlet is adapted to be connected with the fluid storage compartment on the vehicle or to a hose attached to the fluid storage compartment on the vehicle.

The deconstructable tanks 100 can be provided with lines 322 adapted to feed fluid from the bottom of the deconstructable tanks 100 to a blender 350 where the fluid is mixed with proppant material to form a slurry which is pumped into the well and into the shale formation in the earth. In one embodiment, between tens and hundreds of barrels per minute are fed to the blender. Preferably, lines 322 feed fluid from the bottom of the tanks 100 to the blender 350 by gravity, to minimize pumping.

In one embodiment, a second pump (not shown) can be provided to supply fluid from the bottom of the deconstructable tank to a fluid treatment facility and from the fluid treatment facility to the deconstructable tank. The fluid treatment facility can be a facility using known technology to clarify used hydraulic fracturing fluid (also referred to as flowback water). The clarified water can then be returned to the deconstructable tank for storage prior to being pumped out from the top of the tank and reused at another location.

The fluid management system 300 includes a means for containment such as a surrounding berm 324 capable of holding 110% of the volume of the largest deconstructable tank 100.

Water storage systems using the deconstructable tank 100 offer several advantages when compared with prior art systems. When compared with storage pits, the required area for the system is decreased by over 40%, safety and environmental risks are reduced, and cost is reduced significantly. When compared with 500 bbl tanks, the required area is decreased by approximately 60% and cost is reduced significantly. When compared with conventional water tanks of a similar size, the assembly time of 1,000,000 gallon tanks is reduced from approximately 4 weeks to approximately one week. The large, modular wall panels allow for faster construction and deconstruction time while not requiring special wide load permits to transport. The larger wall panels also reduce the amount of seams between panels and the number of bolts needed, thereby reducing the risk of leaks. The base ring and membrane allow the tank to be built without using concrete or other rigid flooring. The base ring allows the wall panels to be aligned and correctly oriented to ensure tank integrity and facilitate assembly.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for constructing a deconstructable tank for storing fluid used in hydraulic fracturing operations or other high volume fluid transfer operations, comprising:
   a. attaching a plurality of base ring pieces to form a base ring having a circular cross section and wherein the base ring comprises a top horizontal portion comprising bolt holes;
   b. sequentially positioning a series of curved panels in a first plurality of curved panels in cooperating arrangement to form a first horizontal band wherein the curved panels are attached to one another using bolts and the first horizontal band has an upper horizontal portion comprising bolt holes and a lower horizontal portion comprising bolt holes;
   c. aligning the bolt holes of the top horizontal portion of the base ring with the bolt holes of the lower horizontal portion of the first horizontal band using a bolt hole alignment tool by inserting a first tapered portion of the bolt hole alignment tool into the aligned bolt holes wherein the bolt hole alignment tool comprises:
      i. an elongated bar having two ends and having the first tapered portion at one end, a strikeable head portion at the other end, a non-tapered cylindrical portion adjacent the first tapered portion and a second tapered portion adjacent and between the non-tapered cylindrical portion and the strikeable head portion; and ii. a handle secured to the second tapered portion of the elongated bar; and d. while holding the handle of the bolt hole alignment tool, striking the strikeable head portion of the bolt hole alignment tool such that the non-tapered cylindrical portion is driven into the aligned bolt holes and the second tapered portion is not driven into the aligned bolt holes;

e. placing a first bolt in a first bolt holding block of a first bolt positioning tool comprising an elongated rod having two ends and having the first bolt holding block fixed at one end and a handle at the other end, a fulcrum supporting the elongated rod between the first bolt holding block and the handle, and a mounting fixture for securing the elongated rod to the fulcrum;

f. positioning the first bolt positioning tool near the aligned bolt holes such that the fulcrum rests on a substantially horizontal surface;

g. operating the handle to insert the first bolt placed in the first bolt holding block through the aligned bolt holes;

h. affixing a first nut to the first bolt; and i. repeating steps (d) through (h) for all desired bolt holes thereby attaching the first horizontal band to the top horizontal portion of the base ring.

2. The method of claim 1, further comprising:

j. sequentially positioning a series of curved panels in a second plurality of curved panels in cooperating arrangement to form a second horizontal band wherein the curved panels are attached to one another using bolts and the second horizontal band has an upper horizontal portion comprising bolt holes and a lower horizontal portion comprising bolt holes;

k. positioning the second horizontal band adjacent the first horizontal band such that the bolt holes of the lower horizontal portion of the second horizontal band align with the bolt holes of the upper horizontal portion of the first horizontal band;

l. placing a second bolt having a bolt head and a threaded end in a second bolt holding block of a second bolt positioning tool comprising the second bolt holding block having a shape to partially enclose the bolt head and having a magnet therein for holding the bolt head therein, and a handle attached to the second bolt holding block such that the threaded end of the second bolt faces away from the second bolt holding block of the second bolt positioning tool;

m. inserting the threaded end of the second bolt into the aligned bolt holes 01 the lower horizontal portion of the second horizontal band align and the upper horizontal portion of the first horizontal band;

n. affixing a second nut to the threaded end of the second bolt;

o. repeating steps (l) through (n) for all desired bolt holes thereby attaching the first horizontal band to the second horizontal band; and p. repeating steps (j) through (n) to attach optional additional horizontal bands as to form a cylindrical tank wall of a desired height.

3. The method of claim 1 or claim 2, wherein each curved panel is held in position by a crane during the method.

4. The method of claim 1, further comprising placing a membrane over the base ring after step (a) and prior to step (b).

* * * * *